P. H. KIMBALL.
Molasses Gate.
No. 67,319.
Patented July 30, 1867.
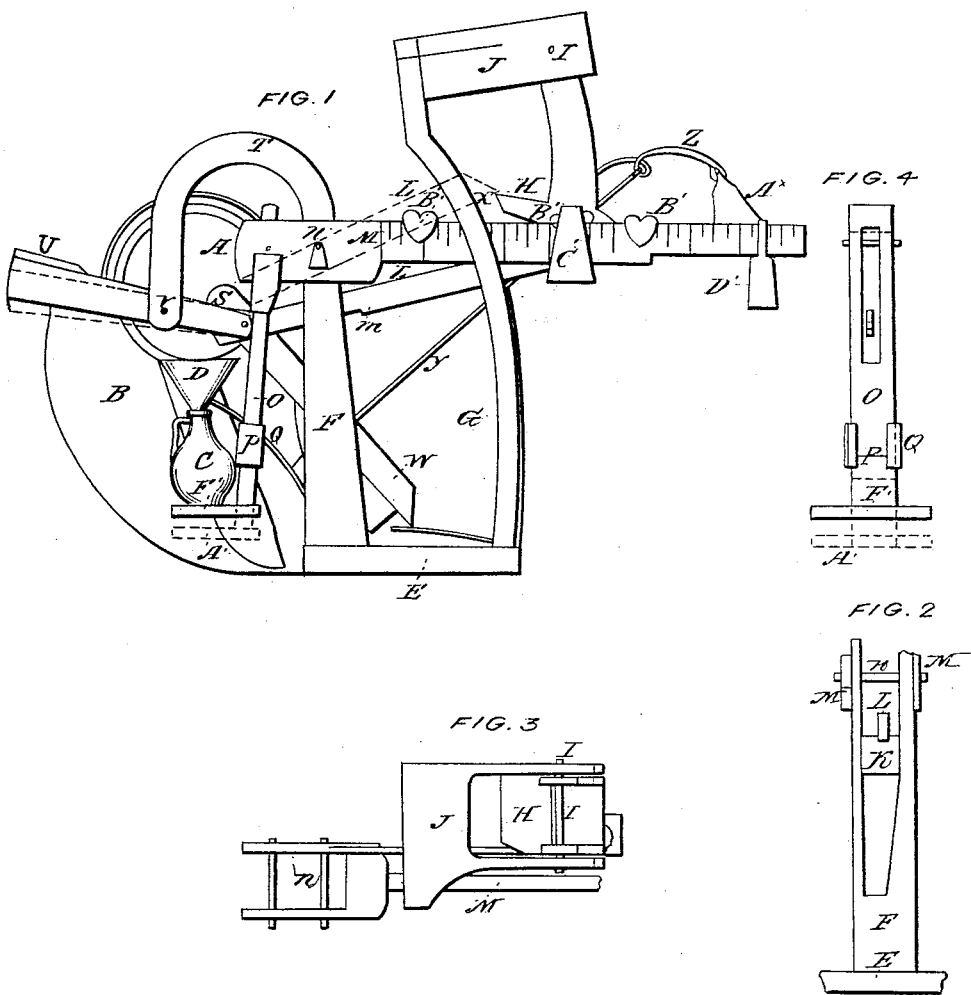
WITNESSES:
INVENTOR:

United States Patent Office.

PHILIP H. KIMBALL, OF PROPHETSTOWN, ILLINOIS.

Letters Patent No. 67,319, dated July 30, 1867.

AUTOMATIC MOLASSES-GATE.

*The Schedule referred to in these Letters Patent and making part of the same.*

TO ALL WHOM IT MAY CONCERN:

Be it known that I, PHILIP H. KIMBALL, of Prophetstown, in the county of Whiteside, in the State of Illinois, have invented an improved Machine for Drawing Molasses; and I do hereby declare that the following is a full, clear, and exact description of the construction and operation of the same, reference being had to the accompanying drawings, and letters of reference marked thereon, making a part of this description, in which—

Figure 1 is a longitudinal elevation of my invention.

Figure 2, a transverse elevation of the standard, to which the weighing-scale, weighted lever, and adjustable platform are attached.

Figure 3, a plan view of the frame which supports the tripping device.

Figure 4, a transverse elevation of the adjustable standard and platform, supporting the receptacle to be filled.

The nature of my invention consists in the use of a weighing-bar, having indicators affixed to said bar for the purpose of designating the quantity of liquid to be drawn from the cask, and an adjustable weight so arranged that it may be moved from one indicator to the other, when a greater or less quantity of liquid is to be drawn; and in arranging an adjustable standard supporting the platform on which the receptacle rests, by which means it may have any desired height; and, further, in the use of a trip-lever so arranged that when the receptacle has received the proper quantity of fluid from the cask, the lever will be tripped by the weight of the material drawn from the cask and shut the faucet. By this means a lever may be set so as to open a faucet and allow the contents of the cask to flow into a measure, jug, or funnel, as the case may require; and also shut a gate and ring a bell when the proper quantity of liquid has been drawn.

I know that various means have been employed for drawing semi-fluids, such as tar, molasses, &c., but as the material so drawn has not been made to indicate the requisite quantity by means of a bell, or shut the gate when the receptacle is full, I claim that my device possesses an important advantage in the following particulars: first, the contents of the cask can be emptied into any vessel without the use of a measure, providing the mouth of the same is of suitable size; second, when the measure has received the proper quantity, the faucet will be shut off, and a bell will be rung and give a suitable alarm to the party having the matter in charge.

It is well known to grocers and others that semi-liquids run slowly during the winter season, and that great watchfulness is required on the part of clerks and others, whose business it is to attend to such matters, and that much loss frequently occurs in consequence of the semi-fluids overrunning the measure, and the extraordinary amount of time required in dealing out the same. If my invention is operated as is hereinafter shown, the loss of material and time referred to will be obviated, as any quantity of the liquid may be drawn without the possibility of mistake in the measure or loss by overflowing.

In order to give a correct understanding of my invention, I have marked corresponding parts in the different drawings by similar letters, and will now give a detailed description.

A represents the end of the cask, supposed to contain the semi-fluid, and is made to rest on the skirting or elevation shown at B, fig. 1, in the usual manner. The arrangement so far shown in drawings is independent of my invention, and is only represented to give a clear idea of how my device may be employed for use. I make a suitable strong platform, E, which is used to support a slotted standard, F, and the upright frame G, sustaining the tripping device H, pivoted at I to an arm, J, rigidly attached to frame G, as seen at fig. 1. The slotted standard F, shown more clearly at fig. 2, has a cross-bar, K, for the support of sliding-lever L, having a notch, m, fig. 1, operating on said cross-bar K, and controlling the longitudinal motion of said lever. The weighing-bar M is made to pass both sides of standard F by means of an open mortise, and rests upon a pivot, n, fig. 1, so as to operate in the manner of common scale-beams, and is made to support an adjustable standard, O, to which is affixed a suitable platform, F', figs. 1 and 4, for sustaining a receptacle, C, for receiving the material from cask A. This adjustable standard O is made in two parts, as seen at P, fig. 4, the lower part to which the platform F is attached being arranged to slide in a clamp, Q, figs. 1 and 4, and thus allow a receptacle of any desired height to rest on platform F', and receive the contents of cask A, drawn through a common faucet, S. A curved arm, T, is attached to standard F, and extends over and supports a weighted lever, U, pivoted to said curved arm at V, fig. 1. A set-lever, W, fig. 1, is attached to faucet S, and made to rest upon the tripping device H when the machine is set for drawing molasses, as seen by the dotted lines X, fig. 1. A bell-cord, Y, is attached to lever W, and a bell-spring, Z, by which means a bell, A', will be rung when the receptacle C forces down platform F', as seen by dotted lines A*. A sliding weight, D', is made to operate on weighing-bar M, and balance the weight of receptacle C. The hearts B' B' B' are made to indicate pints, quarts, gallons, &c., to be drawn from cask A, a movable weight, C', being made to rest on either of the indicators B', according to the amount of fluid to be drawn.

Operation.

The lever W can be raised up and set on the tripping device H, as shown by dotted lines X aforesaid, after which the weight of liquid drawn will trip lever W, and shut faucet S, and ring the bell A*.

I am not particular as to the material used in the manufacture, but prefer cast iron, as being both cheap and substantial.

Having thus fully described my device, what I claim therein as new, and desire to secure by Letters Patent, is—

The combination of a weighing or scale-beam, M, carrying a movable weight, C', with a suspended platform, F', tripping devices U L H, and with an arm or lever W, secured to and operating the faucet or cock S of a barrel or other vessel, all substantially in the manner and for the purpose herein set forth.

I claim also the combination of an alarm bell, A*, with an arm, W, attached to a cock or faucet, S, when said arm is made to close said faucet automatically, substantially in the manner and for the purpose herein described.

PHILIP H. KIMBALL.

Witnesses:
    GEO. L. CHAPIN,
    A. HAYWARD.